May 26, 1942.  E. O. KUNKEL  2,284,216

HIGH PRESSURE UNION

Filed June 27, 1941

INVENTOR
ELZY O. KUNKEL
BY Zugelter & Zugelter
ATTORNEYS

Patented May 26, 1942

2,284,216

UNITED STATES PATENT OFFICE 2,284,216

HIGH PRESSURE UNION

Elzy O. Kunkel, Sandoval, Ill., assignor of one-half to Otto E. Ellick, Covington, Ky.

Application June 27, 1941, Serial No. 400,062

2 Claims. (Cl. 285—122)

This invention relates to pipe couplings and more particularly to improvements of pipe couplings of the so-called high pressure, heavy duty type.

An object of the present invention is directed to improvements in the component parts of a pipe coupling whereby a highly efficient leak-proof union for high pressure fluid is provided between the adjacent ends of pipes and other conductors connected thereby.

Another object of the invention is to provide an inexpensive, yet nevertheless rugged, heavy duty, double seated pipe coupling wherein each of the seats are adapted to house a deformable gasket.

Still another object of the invention is to provide a pipe coupling having the hereinabove described characteristics, which is particularly designed to effectively lessen the occurrence of blowouts in or at the couplings of a high pressure pipe line.

These and other objects are attained by the means described herein and disclosed in the accompanying drawing, in which.

The coupling of the present invention comprises generally speaking, three basic elements, to wit: a pair of complementary half coupling members 10 and 11 which are adapted to be drawn together to provide a high pressure heavy duty union, by means of a coupling nut 12.

Figure 1:
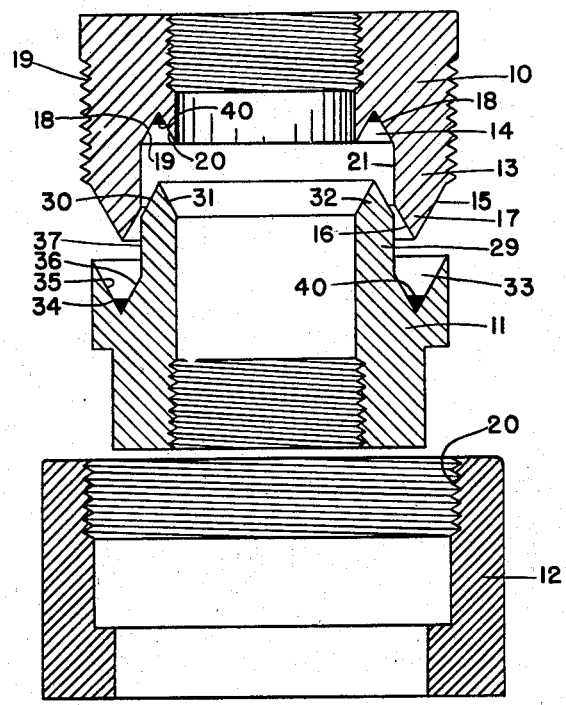
Fig. 1 is a longitudinal section of my improved coupling, or union, comprising the present invention with the component parts in an extended position.

With particular reference to coupling member 10 it will be noted that it includes a forwardly projecting cylindrical tongue 13 and an annular socket portion 14. The forward or free end of tongue 13 is preferably provided with a double taper as at 15 and 16 for providing a V-tip 17, and the bottom of socket 14 is preferably provided with a V-shaped seat 18 defined by the upwardly convergent walls 19 and 20 respectively, as shown. The outer face of member 10 may be provided with external threads 19 which are engageable by internal threads 20 of coupling nut 12. With particular reference to Fig. 1 it will be observed that an annular wall 21 is provided between the adjacent ends of wall 19 of socket 14 and wall 16 of V-tip 17.

With particular reference now to coupling member 11, it will be observed that it comprises a forwardly projecting, annular tongue 29 the forward or free end of which is provided with inwardly converging walls 30 and 31 for providing a V-tip 32. Member 11 likewise includes an annular socket portion 33 which is provided with a V-shaped seat 34 defined by a pair of downwardly convergent walls 35 and 36. An annular wall 37 is provided between adjacent ends of wall 30 of V-tip 32 and wall 36 of socket 33.

As clearly disclosed in the drawing, the respective forwardly projecting members 13 and 29 of coupling members 10 and 11 are adapted to be projected into the respective complementary socket portions 33 and 14 of one another. It will likewise be noted that annular wall 21 of coupling member 10 and annular wall 37 of coupling member 11 are adapted to make substantial coplanar engagement with one another when members 10 and 11 are assembled, as disclosed in Fig. 2. Annular walls 21 and 37 preferably make a close, but sliding fit whereby to facilitate ease of assemblage of a union.

In the preferred embodiment of the invention the bottom portion of each of sockets 14 and 33 are provided with a suitable gasket, preferably of a deformable material, such as poured lead or the like, indicated generally in the drawing by the numeral 40. When the complementary coupling members 10 and 11 are drawn together by the action of coupling nut 12 the deformable gasket material 40 is substantially distributed evenly between the corresponding and adjacent faces of each V-tip and the V-seat of its complementary socket portion of the other coupling member. It will be observed that the closer members 10 and 11 are drawn together, the greater will be the force tending to distribute the deformable material 40 over the divergent faces of the V-tips of tongues 13 and 29. Continued tightening of nut 12 will tend to force the deformable material outwardly beyond the ends of said tips thence between annular faces 21 and 37, into the threaded connection between coupling nut 12 and the external threads 19 of member 10, and into the interior of the coupling at 41, thereby distributing the gasket forming material between the adjacent, complementary portions of coupling members 10 and 11.

In the preferred embodiment of the invention, the lateral width of annular faces 21 and 37 are so proportioned as to provide a well defined vertical wall separating the adjacent portions of the V-tips of tongue members 13 and 29 of the complementary coupling members 10 and 11.

Such construction provides an efficient barrier against the passage of high pressure fluid from the interior of the coupling thence into and between the adjacent faces 21 and 37, thereby precluding the accumulation of high pressure fluid between said faces, which has heretofore been the direct cause of blowouts in high pressure unions.

If desired, the thickness of the inner tongue, 29 in the drawing, may be of a lesser dimension than the thickness of the outer tongue 13 which effectively reinforces the inner tongue against the disruptive forces of the high pressure fluid present in the interior of the union.

Figure 2:
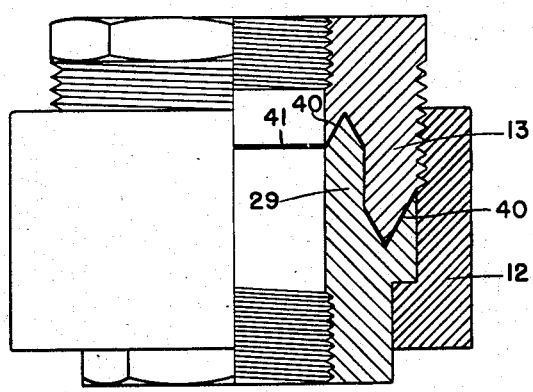
Fig. 2 is an assembled view of the coupling of Fig. 1, a part thereof being shown in longitudinal section for revealing the interrelationship of the component parts thereof when assembled.

As disclosed in Fig. 2 the inner bore of an assembled union is smooth and uniform in diameter whereby the tendency for a turbulent condition to arise in the high pressure fluid passing therethrough is effectively eliminated.

When the coupling members have been fully assembled the annular faces 21 and 37 are disposed in substantial coplanar parallelism throughout their width.

It will be observed that the complementary faces of the cooperating tongue and seat portions of coupling members 10 and 11 are inclined relative to the longitudinal axis of said members for providing a tortuous passageway from the inside to the outside of the union. By reason of such construction, wherein the angle between the tapered faces of the U-tip of the tongues is preferably, though not necessarily, less than a right angle, a seal is provided which will permit the safe and reliable passage of fluids under pressure through the union.

It should be understood that various modifications and changes in the structural details of the device may be made, within the scope of the appended claims, without departing from the spirit of the invention.

What is claimed is:

1. A high pressure coupling comprising a pair of separable coupling members each of which includes a forwardly projecting tongue the free outer edge of which terminates in a V-tip having a base portion, a recessed socket portion the bottom of which terminates in a V-seat likewise having a base portion, and an annular cylindrical wall extending a substantial distance between the base portion of the V-tip of a tongue and the base portion of the V-seat of its associated socket, thereby to establish an exaggerated offset reltaionship of the V-seats of the coupling members, with the cylindrical wall portions separating the base portions of the seats and tips, while at the same time overlying one another to be forced into intimate contact by the outward force of high pressure in the coupling, the tongue, socket and cylindrical wall portion of one coupling member being the complement of the other coupling member, a gasket of deformable material disposed in the seat of each socket, and means for drawing said coupling members together for embedding the V-tip of each tongue in the V-seat of its complementary socket and for distributing the deformable gasket material over the adjacent portions of each V-tip and its complementary V-seat and for disposing the cylindrical walls of the respective coupling members in substantially coplanar parallelism throughout their respective lengths.

2. A high pressure coupling comprising a pair of separable coupling members each of which includes a central bore, a forwardly projecting tongue the free outer edge of which terminates in a V-tip having a base portion, a recessed socket portion the bottom of which terminates in a V-seat likewise having a base portion, and an annular cylindrical wall extending a substantial distance between the base portion of the V-tip of a tongue and the base portion of the V-seat of its associated socket, thereby to establish an exaggerated offset relationship of the V-seats of the coupling members, with the cylindrical wall portions separating the base portions of the seats and tips, while at the same time overlying one another to be forced into intimtae contact by the outward force of high pressure in the coupling, the tongue, socket and cylindrical wall portion of one coupling member being the complement of the other coupling member, a gasket of deformable material disposed in the seat of each socket, and means for drawing said coupling members together for embedding the V-tip of each tongue in the V-seat of its complementary socket and for distributing the deformable gasket material over the adjacent portions of each V-tip and its complementary V-seat, for disposing the cylindrical walls of the respective coupling members in substantial coplanar parallelism throughout their respective lengths, and for disposing the central bores of the respective coupling members in an in line relationship whereby to provide a substantially continuous passage of substantially uniform diameter through the coupling.

ELZY O. KUNKEL.